Nov. 13, 1962     J. J. BLUMKIN     3,063,489

TRACTION DEVICE

Filed Oct. 9, 1961

INVENTOR.
JOSEPH J. BLUMKIN

BY

ATTORNEY

United States Patent Office 3,063,489
Patented Nov. 13, 1962

3,063,489
TRACTION DEVICE
Joseph J. Blumkin, 41 Vanolinda St., Rochester 21, N.Y.
Filed Oct. 9, 1961, Ser. No. 143,764
3 Claims. (Cl. 152—213)

This invention relates to traction devices and more particularly to devices for attachment to vehicular tires so as to improve the traction thereof.

A principal object of this invention is to provide a traction device for attachment to vehicular tires which is simple to apply and remains secure in operative position despite considerable vibration.

A further object of this invention is to provide a traction device which is easily adjustable and is extremely effective over a variety of road conditions.

A still further object of this invention is to provide a traction device, of the type described, which is of basic construction and can be fabricated at minimum cost.

Other objects and advantages of my invention will be set forth in the claims and will be apparent from the following description, when taken in connection with the accompanying drawings, in which:

Figure 1:
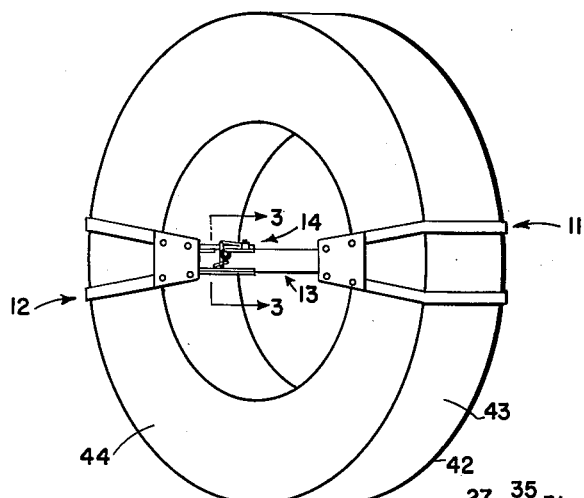
FIGURE 1 is a perspective view showing the device in operative position on a typical vehicular tire.

The traction device contemplated by this invention comprises generally gripping members 11 and 12, an extension bar 13, and locking means 14; as shown in FIGURE 1.

The gripping means 11 consists of U-shaped members 15 and 16 which are arranged in a spaced, opposed relation. Substantially formed to accommodate therein the tread and wall portions of a vehicular tire. The members 15 and 16 are secured together at one end thereof by a link 17, and at the other confronting ends thereof by a plate 18.

The gripping means 12 is similarly comprised of U-shaped members 21 and 22, a link 23, and a plate 24.

The extension bar 13 includes a flat bar 25, one end of which is secured to the plate 18. The other end of the flat bar 25 is accommodated within a channel 26 having walls 27 and a base portion 28. Groove 29 is provided adjacent to the base portion 28 and it accommodates the flat bar 25 which is freely slideable therein. One end of the channel 26 is secured to the plate 24.

Figure 3:
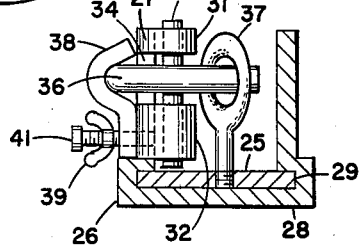
FIGURE 3 is an enlarged sectional view of the device taken along lines 3—3 of FIGURE 1.
Figure 2:
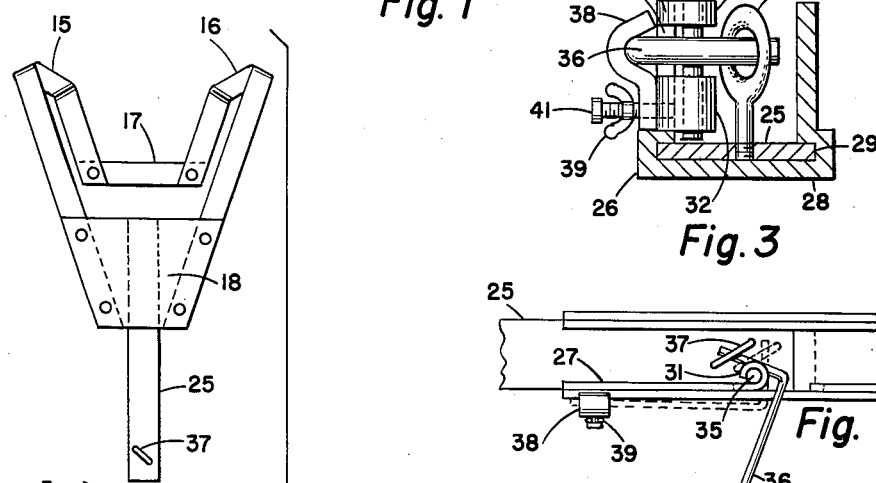
FIGURE 2 is a plan view of the device shown partially unassembled.
Figure 4:
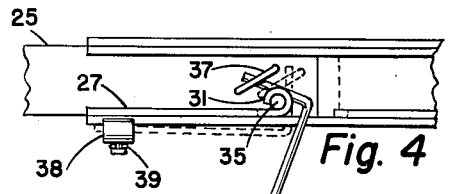
FIGURE 4 is an enlarged fragmentary plan view of the device illustrating various components thereof in locked and unlocked positions.
Figure 5:
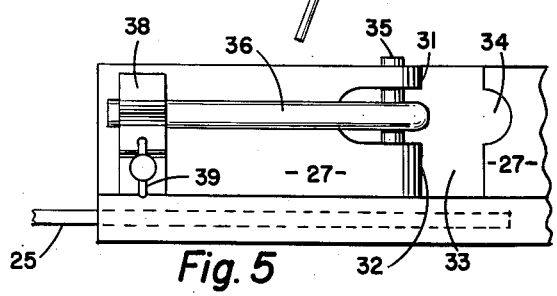
FIGURE 5 is an enlarged fragmentary side elevational view of the device.

The locking means 14, as best seen in FIGURES 3, 4 and 5 includes hinge portions 31 and 32 which are struck out of one wall 27 of the channel member 26, thereby leaving a space 33. The wall 27 is also provided with a slot 34 which is in communication with the space 33. A pin 35 is rotatably mounted in the hinged portions 31 and 32. An L-shaped locking bar 36 is integrally secured adjacent to one end to the pin 35 so that the short leg thereof is positioned within the channel 26, so that the bar 36 is rotatable with the pin 35 into and out of the slot 34. The free end of the short leg of the bar 36 is insertable within a locking eye 37. The longer leg of the bar 36 is adjustably clamped by a locking plate 38 which is secured in position by a locking nut 39 threaded to a bolt 41. The bolt 41 is freely moveable through the plate 38 and is secured at its inner end within the wall 27.

As can be best seen in FIGURE 1 this traction device is operatively mounted to a vehicular tire 42, having a tread area 43 and walls 44. The gripping members 11 and 12 accommodate therein the tread area 43 and the walls 44. As can be seen in FIGURE 4 the device is positioned on the tire 42 with the locking bar 36 in an open position. The bar 25 is then freely moveable within the channel 26 so that the extension bar 13 can be adjusted to the diameter of the particular tire involved. When this adjustment is made the locking bar 36 is positioned beneath the locking plate 38 and is secured therein by means of rotating the locking nut 39. When it is desired to remove the device from the tire 42, the reverse procedure is followed. It can be seen that bar 25 may be completely removed from the channel 26 with the locking bar 36 in an open position in which case the free end of the short leg of the bar 36 is freely removeable from the eye 37.

It can therefore be seen that a traction device has been provided which is simple to mount to a conventional vehicular tire and which has a positive locking feature. The device may be easily fabricated in various sizes to accommodate various sizes of vehicular tires. The device can be easily and inexpensively manufactured from conventional materials.

Having thus described my invention I claim:

1. A traction device comprising a pair of gripping members arranged in a spaced, opposed relation, a flat bar having one end thereof connected to one of said gripping members, a channel shaped member having one end thereof connected to the other of said gripping members, said channel member adapted to slideably receive therein said bar, an eye secured to the free end of said bar, a pin rotatably mounted in the free end of said channel, an L-shaped rod secured to said pin and positioned so that the free end of one leg thereof is moveable into and out of said eye, and a securing means carried by an outer wall of said channel member and adapted to receive therein the free end of the other leg of said L-shaped member.

2. A traction device comprising a pair of gripping members arranged in a spaced, opposed relation, a flat bar having one end thereof connecting to one of said gripping members, a channel shaped member having one end thereof connected to the other of said gripping members, said channel member adapted to slideably receive therein said bar, a pin rotatably mounted in the free end of said channel, an L-shaped rod secured to said pin, means secured to the free end of said bar for receiving therein the free end of one leg of said L-shaped rod, and securing means carried by an outer wall of said channel member and adapted to receive therein the free end of the other leg of said L-shaped member.

3. A traction device comprising a pair of gripping members arranged in a spaced, opposed relation, a flat bar having one end thereof connected to one of said gripping members, a channel shaped member having one end thereof connected to the other of said gripping members, said channel member adapted to slideably receive therein said bar, an eye secured to the free end of said bar, an L-shaped rod rotatably mounted in the free end of said channel and positioned so that the free end of one leg thereof is moveable into and out of said eye, and a securing means carried by an outer wall of said channel member and adapted to receive therein the free end of the other leg of said L-shaped member.

References Cited in the file of this patent

UNITED STATES PATENTS 2,850,067    Reeves  ---------------- Sept. 2, 1958
2,990,868    Steele  ----------------- July 4, 1961